(No Model.)
J. RONK.
CAR COUPLING.
No. 438,258. Patented Oct. 14, 1890.
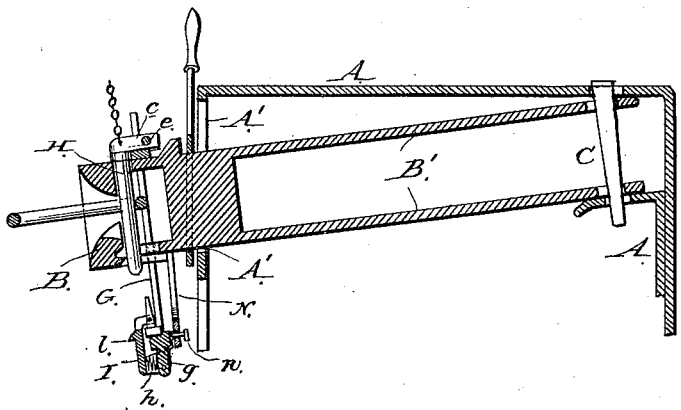
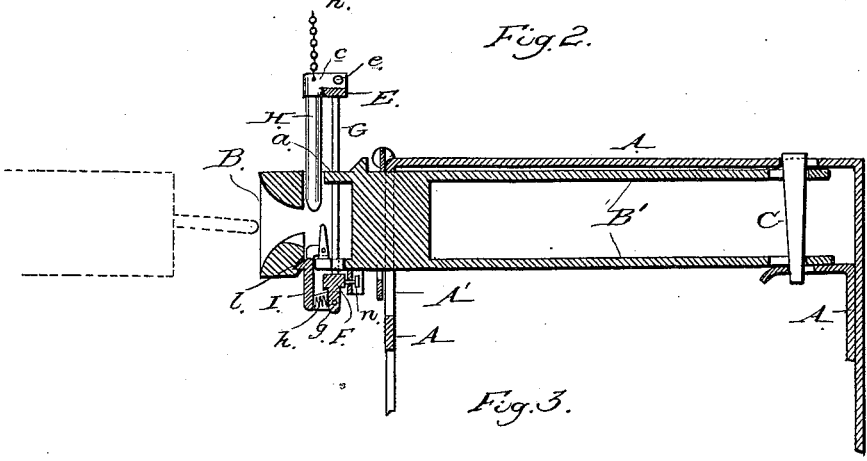
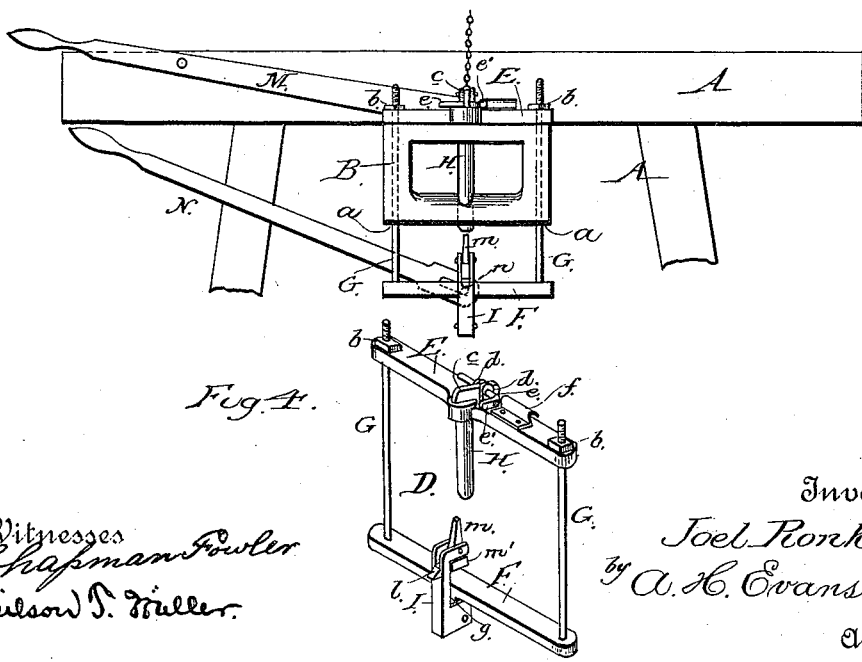
Witnesses
Chapman Fowler
Neilson T. Miller
Inventor
Joel Ronk,
by A. H. Evans & Co
Attorneys

United States Patent Office.

JOEL RONK, OF BUCYRUS, OHIO.

CAR-COUPLING.

SPECIFICATION forming part of Letters Patent No. 438,258, dated October 14, 1890.

Application filed July 19, 1890. Serial No. 359,318. (No model.)

*To all whom it may concern:*

Be it known that I, JOEL RONK, a citizen of the United States, residing at Bucyrus, in the county of Crawford and State of Ohio, have invented certain new and useful Improvements in Car-Couplings, of which the following is a full and clear description, reference being had to the accompanying drawings, forming part of this specification, in which—

Figure 1 is a longitudinal sectional view showing the forward end of the draw-head and the gate lowered. Fig. 2 is a similar view showing the draw-head and gate elevated, the gate being held in position by its latching-arm. Fig. 3 is a front view of Fig. 1. Fig. 4 is a view of the gate removed.

My invention relates to means for automatically coupling cars; and it consists in the constructions and combinations of devices, which I shall hereinafter fully describe and claim.

To enable others skilled in the art to which my invention appertains to make and use the same, I now describe its construction and indicate the manner in which the same is carried out.

In the accompanying drawings, A represents a suitable frame-work, which may represent a portion of the car-body, said frame having an opening A' in its central front portion to permit the front of the draw-head to have a vertical movement, for purposes hereinafter mentioned. The draw-head B has a draw-bar B', which is slotted upon a pin C at its rear, thereby forming substantially a hinge-connection with the frame A, and said draw-head is formed to receive the coupling-link in the usual manner.

Near the sides of the draw-head are formed holes $a$, which serve as guides for the movements of a gate D, said gate consisting of an upper and lower cross-bar E and F, respectively, one of which lies above the cross-head and the other below the same, and both bars being connected together by rods G, which pass through the holes $a$ in the draw-head, whereby the gate is guided in its vertical movements. The rods G may have threaded upper ends engaged by nuts $b$, which permit the separation of the parts of the gate and the removal of the same when desired.

The coupling-pin H is of the usual form, except that it has a rearwardly-extending lug $c$ from its top surface, and which is designed to be held between two lugs or ears $d$, rising from the top of the bar E, and to be secured to said bar by a pin $e$, which passes transversely through the ears $d$ and lug $c$, the said cross-bar E having also a grooved or raised plate $f$ on its top surface in line with the pin $e$, whereby said pin may be slipped endwise out of connection with the lug and ears to permit the coupling-pin to be used independently of the gate, as when coupling by hand. To prevent the accidental displacement of the pin $e$ the latter is formed with a head $e'$, which, when the pin is turned as in Fig. 4, lies between the plate $f$ and the adjacent lug $d$, but when the pin is turned to a position opposite to that shown in said figure the head $e'$ is in alignment with the groove or channel in the plate $f$ and may be readily withdrawn.

The lower cross-bar F has a downward extension $g$ from its center, and to this extension near the bottom thereof is pivotally secured a vertically-disposed latching-arm I, having a spring or cushion $h$ introduced between its front wall and the extension $g$, and having a lug $l$ projecting from its front near the top, adapted to engage a seat on the draw-head to hold the gate D in an elevated position, as shown in Fig. 2.

In the top of the latching-arm I is pivotally mounted a trip $m$, having a weighted head $m'$ at one end, which keeps the trip normally in a vertical position and prevents said trip being forced backward by reason of the head striking against the latching-arm.

Pivoted to the frame-work in any suitable manner is a lever M, whose inner end straddles the draw-bar near its head and serves as a means whereby the draw-head may be raised and lowered in vertical planes to accommodate the draw-head on the car to be coupled. A second lever N, pivoted upon or to the frame A, has its inner end slotted and engaging a pin $n$, projecting from the back of the latching-arm I, and serves as a means for raising and lowering the gate D.

To operate the gate, the lever N is pressed down, which elevates the gate and causes the coupling-pin to be raised and the latching-arm to be passed upward through the coupling-pin hole until the lug $l$ engages its seat on the front wall of the hole, as in Fig. 2, the trip-arm *m* being in the path of the link on the approaching car. When the link of the approaching car enters the draw-head B, it strikes the trip *m*, and, as the latter is held by its head against the backward movement, the latching-arm I is moved backward, thereby releasing its lug *l* from its seat and permitting the gate and its coupling-pin to drop and complete the coupling. To uncouple, the gate is raised in the manner just described, when the coupling-link may be withdrawn, the trip *m* swinging forward, so as to permit the withdrawal of the link.

Having thus described my invention, what I claim as new, and desire to secure by Letters Patent, is—

1. In a car-coupling, the combination, with the draw-head, of a vertically-moving gate mounted therein and carrying the coupling-pin, a pivoted latching-arm carried by the gate and adapted to engage the draw-head, whereby the gate is held in an elevated position, and a pivoted trip on the latching-arm adapted to be struck by the coupling-link of the approaching car, whereby the gate is released and the coupling automatically effected, substantially as herein described.

2. In a car-coupling, the combination, with the draw-head, of a gate mounted therein and consisting of upper and lower cross-bars and connecting-rods, a coupling-pin having an extension whereby said pin may be detachably connected with the gate, a pivotally-secured latching-arm on the lower cross-bar having a lug adapted to engage the draw-head and hold the gate elevated, a trip on the latching-arm for releasing said arm when struck by the incoming coupling-link, and a lever for operating the gate, substantially as herein described.

3. A car-coupling comprising a draw-head adapted to be adjusted vertically, a lever for moving the draw-head, a vertically-moving gate having the coupling-pin attached to it and provided with a yielding pivotally-secured latching-arm and pivoted outwardly-moving trip, and a lever for moving the gate, said lever having its inner end slotted on a pin projecting from the yielding latching-arm, substantially as herein described.

JOEL RONK.

Witnesses:
S. R. HARRIS,
JOSEPH KRISELY.